(12) United States Patent
Harthauser

(10) Patent No.: US 6,796,391 B2
(45) Date of Patent: Sep. 28, 2004

(54) HYDRAULIC CLAMPING DEVICE FOR A VARIABLE GAUGE TRACK VEHICLE

(75) Inventor: Werner Harthauser, Wertingen (DE)

(73) Assignee: Bauer Maschinen GmbH, Schrobenhausen (DE)

( * ) Notice: Subject to any disclaimer, the term of this patent is extended or adjusted under 35 U.S.C. 154(b) by 0 days.

(21) Appl. No.: 10/404,444

(22) Filed: Apr. 2, 2003

(65) Prior Publication Data

US 2003/0205416 A1 Nov. 6, 2003

(30) Foreign Application Priority Data

May 2, 2002 (DE) ..................................... 202 06 970 U

(51) Int. Cl.[7] .............................................. B62D 55/00
(52) U.S. Cl. ....................... 180/9.48; 180/9.5; 180/9.52
(58) Field of Search ................................ 180/9.48, 9.5, 180/9.1, 9, 9.52; 188/67

(56) References Cited

U.S. PATENT DOCUMENTS

| | | | | |
|---|---|---|---|---|
| 2,681,231 A | * | 6/1954 | Kondracki | 180/9.48 |
| 3,037,571 A | * | 6/1962 | Zelle | 180/9.48 |
| 3,712,398 A | * | 1/1973 | Althaus | 180/9.48 |
| 3,749,193 A | * | 7/1973 | Blase et al. | 180/9.48 |
| 3,820,616 A | * | 6/1974 | Juergen | 180/9.48 |
| 3,840,095 A | * | 10/1974 | Matson | 188/67 |
| 3,894,598 A | * | 7/1975 | Yeou | 180/9.48 |
| 4,431,074 A | * | 2/1984 | Langerud | 180/9.48 |
| 5,598,896 A | | 2/1997 | Haest | |
| 6,145,610 A | * | 11/2000 | Gallignani | 180/9.48 |
| 6,662,887 B2 | * | 12/2003 | Agutter | 180/11 |

* cited by examiner

*Primary Examiner*—Lesley D. Morris
*Assistant Examiner*—Tony Winner
(74) *Attorney, Agent, or Firm*—Jacobson Holman PLLC

(57) ABSTRACT

A crawler running gear, particularly for a construction machine, having a central section and two crawler supports with in each case one crawler track. The crawler supports are arranged along a longitudinal direction on both longitudinal sides of the central section and are fixed to cross members, which are in each case displaceably mounted in a displacement direction on the central section by means of at least one guide. For the purpose of a stable connection at least one clamping element is provided with which a cross member can be braced at right angles to the displacement direction relative to its guide.

14 Claims, 1 Drawing Sheet

HYDRAULIC CLAMPING DEVICE FOR A VARIABLE GAUGE TRACK VEHICLE

BACKGROUND OF THE INVENTION

1. Field of the Invention

The invention relates to a crawler running gear, particularly for a construction machine, having a central section and two crawler supports with in each case a crawler track, the crawler supports being positioned in a longitudinal direction on both longitudinal sides of the central section and are fixed to cross members, which are in each case displaceably mounted in a displacement direction by means of at least one guide on the said central section.

2. Description of the Related Art

Such crawler running gears are more particularly used on construction machines such as cranes and grabs and more especially on earthworking machines, such as e.g. excavators, bulldozers, etc. due to their good all-terrain characteristics. The central section of the crawler running gear or said running gear as a whole is also referred to as a bogie. The crawler supports with a crawler track can also be referred to as track frames.

For the adjustment of the gauge of the crawler running gear, it is known to displace at right angles to the longitudinal direction the two crawler supports on the longitudinal sides of a central section. The track frames are telescopically constructed. Thus, in operation it is possible to set a maximum gauge, which increases the stability of the construction machine. However, a reduction of the gauge is appropriate for the transportation of the construction machine to and from the building site. A description of such a crawler running gear is provided in U.S. Pat. No. 5,598,896.

The cross members linking the central section and the mandrel with the two crawler supports or track frames can have a rectangular or also a circular cross-section.

In order to compensate the twisting with respect to one another of the two track frames resulting from ground unevennesses, in the case of circular, tubular cross members it is necessary to have a comparatively complicated design of the junction point to the track frames.

Compared therewith rectangular cross members can admittedly be more simply designed, but in the extended state rectangular cross members tendentially have a fit clearance between the cross members and the guidance thereof in the central section and this increases with greater extension widths. This clearance has a disadvantageous effect on precisely installing an earth-working implement or a vibrating support device, e.g. a vibratory pile hammer. The setting of a precise working point is then difficult and the implement has to be moved in the case of kinematic and also weight-based shifts of subassemblies and the set attachment or starting point must be readjusted.

SUMMARY OF THE INVENTION

The object of the invention is to provide a crawler running gear of the aforementioned type ensuring a very rigid connection between the cross members and central section.

This object is achieved by the crawler running gear having a central section and two crawler supports with in each case a crawler track, the crawler supports being positioned in a longitudinal direction on both longitudinal sides of the central section and are fixed to cross members, which are in each case displaceably mounted in a displacement direction on said central section by means of at least one guide, wherein at least one clamping element is provided with which a cross member can be braced at right angles to the displacement direction with respect to its guide.

Preferred embodiments of the crawler running gear according to the invention are given in the dependent claims.

According to the invention, the crawler running gear of the aforementioned type is further developed in that at least one clamping element is provided enabling a cross member to be clamped at right angles to the displacement direction with respect to its guide.

A fundamental idea of the invention is, unlike in the case of the prior art crawler running gears, in which there is a fixing of the cross members only essentially in the displacement direction, to now provide through clamping elements a bracing at right angles to the displacement direction, thereby ensuring a more secure fixing.

An important advantage of the invention is that with constructionally simple means it is possible to obtain a secure, rigid connection between the cross members and central section, so that a readjustment of the machine, particularly when working with a vibrating device, such as e.g. a vibratory pile hammer, is much less frequently necessary than in known crawler running gears. The corresponding operations can consequently be carried out in a shorter time and therefore less expensively on the building site.

In a particularly preferred embodiment of the crawler running gear the clamping elements are constructed as hydraulically operable clamping cylinders. Advantages result through the high force action attainable through the hydraulic cylinders, accompanied at the same time by a compact construction.

The clamping cylinders can have clamping jaws, whose contours are adapted to the cross member shape in order to obtain a maximum bracing effect. In addition, in order to obtain a maximum friction between the cross members and the clamping jaws, a coating and/or profiling can be provided on the corresponding contacting areas of the cross members and/or clamping jaws.

A construction in which clamping cylinders are provided on opposite sides for at least one of the cross members is advantageous with a view to the stability of the structure. In principle, the clamping cylinders can be located in any direction. To compensate vibrating movements in the vertical direction, it is particularly advantageous to position the clamping cylinders on the top and bottom of the cross members. The facing clamping cylinders are preferably mutually displaced in the displacement direction so that tilting occurs, so as to additionally fix the cross members.

A particularly stable bracing can be obtained if there are in each case four clamping cylinders for each cross member.

A further stability rise can be obtained by providing clamping elements, particularly clamping cylinders on at least one of the cross members in the displacement direction and at different positions.

A guide strut of the cross member can essentially have any random shape, particularly also a circular shape. However, preferably the guide strut of the cross member is angular, particularly rectangular in cross-section. This firstly simplifies the assembly and disassembly of cross members and crawler supports and secondly the clamping jaws of the clamping cylinders can be given a simpler design.

In a preferred embodiment of the invention for the displacement of the cross members hydraulic cylinders are provided, which can fundamentally be directly articulated to the crawler supports. The particular hydraulic cylinder can also be on the one hand connected to the associated cross member in a direct manner and on the other to the central section. Normally each cross member has one or two hydraulic cylinders.

Each crawler support is preferably fixed to two cross members. However, in certain cases there may be only one or several cross members per crawler support.

BRIEF DESCRIPTION OF THE DRAWINGS

Further advantages and features of the crawler running gear according to the invention are described in greater detail hereinafter relative to the attached diagrammatic drawings, wherein show.

DETAILED DESCRIPTION OF THE INVENTION

Figure 1:
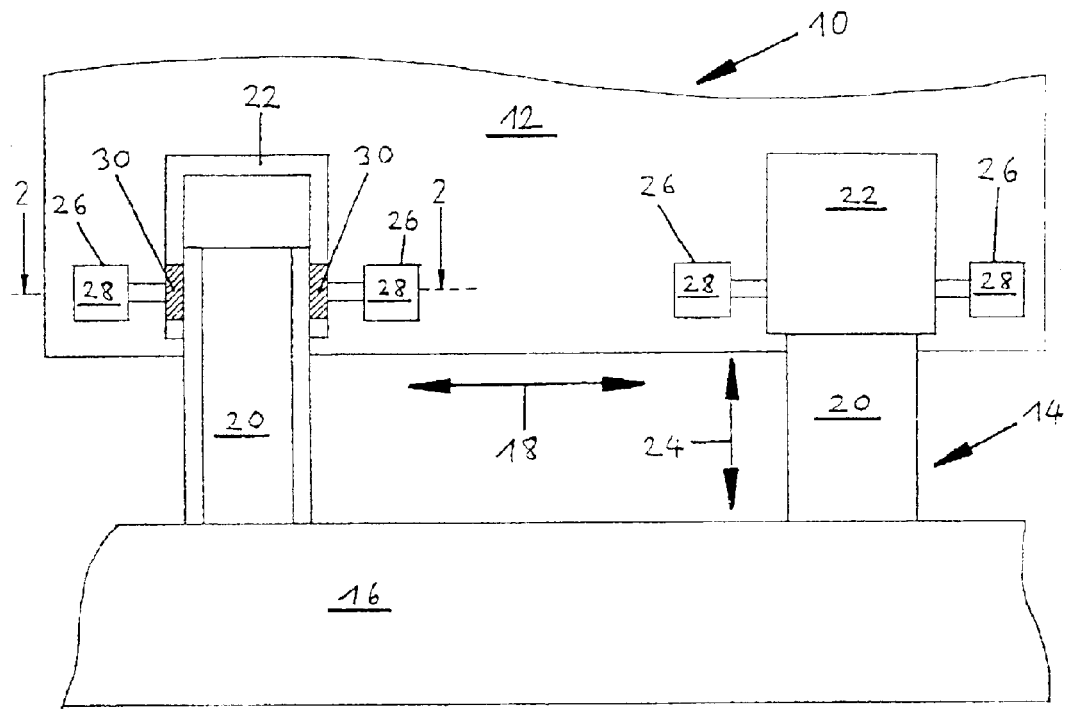
FIG. 1 A diagrammatic, partial sectional view of a crawler running gear according to the invention.

FIG. 1 shows in a diagrammatic, partial sectional view a crawler running gear 10 according to the invention having a central section 12, to which is fixed by means of cross members 20 a crawler support 14 with a crawler 16 extending in a longitudinal direction 18. The cross members 20 are in each case displaceably mounted in a displacement direction 24 in guides 22 fixed to the central section 12. The cross members 20 and guides 22 are in each case manufactured from a square steel section. For adjusting the gauge of the crawler running gear 10, the crawler supports 14 can be retracted and extended in the displacement direction 24 with the aid of hydraulic cylinders, which are not shown in FIG. 1 in order not to overburden the latter.

In order to ensure a very rigid connection between the cross members 20 and the guides 22, on the latter are in each case provided four clamping elements 26.

Figure 2:
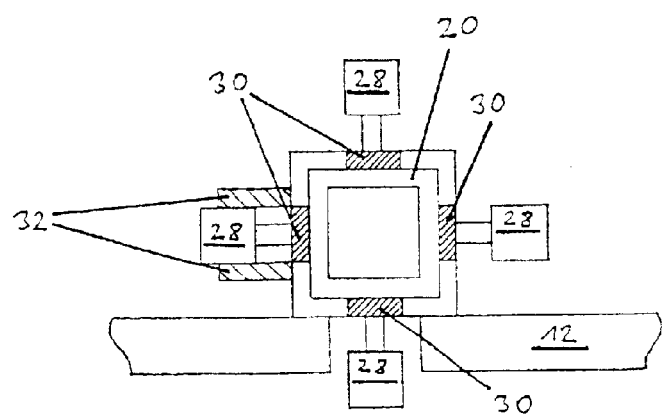
FIG. 2 A sectional view along line 2—2 in FIG. 1.

In the embodiment shown they are constituted by clamping cylinders 28 with clamping jaws 30. The clamping cylinders 28 are fixed by fixing elements 32 to the guides 22. This is shown diagrammatically in the sectional view of FIG. 2 and where, so as not to overburden representation, only two fixing elements 32 are shown. Identical components are given the same reference numerals in FIG. 2 as in FIG. 1.

The clamping cylinders 28 act from in each case opposite sides both in the horizontal and vertical directions on the cross members 20, which leads to a particularly stable bracing effect. A fit clearance between the cross members 20 and associated guide 22 is consequently largely avoided. This greatly facilitates matters particularly when working with a vibrating implement.

In principle, the clamping cylinders 28 can be randomly braced and relieved. However, preference is given to an operating mode in which the clamping cylinders 28 are always braced, except on extending or retracting the crawler supports 14.

What is claimed is:

1. Crawler running gear having a central section and two crawler supports with in each case a crawler track, the crawler supports being positioned in a longitudinal direction on both longitudinal sides of the central section and are fixed to cross members, which are in each case displaceably mounted in a displacement direction on said central section by means of at least one guide, wherein at least one clamping element is provided with which a cross member can be braced at right angles to the displacement direction with respect to its guide, wherein the at least one clamping element is constructed as a hydraulically operable clamping cylinder, and wherein for at least one of the cross members clamping cylinders are provided on facing sides.

2. Crawler running gear according to claim 1, wherein the clamping cylinders have clamping jaws.

3. Crawler running gear according to claim 2, wherein the clamping jaws and/or the cross members are provided with a coating and/or a profiling.

4. Crawler running gear according to claim 1, wherein a guide strut of the cross member is given a cross-sectional angular, construction.

5. Crawler running gear according to claim 1, wherein each crawler support is mounted on two cross members.

6. Crawler running gear, having a central section and two crawler supports with in each case a crawler track, the crawler supports being positioned in a longitudinal direction on both longitudinal sides of the central section and are fixed to cross members, which are in each case displaceably mounted in a displacement direction on said central section by means of at least one guide, wherein at least one clamping element is provided with which a cross member can be braced at right angles to the displacement direction with respect to its guide, wherein the clamping elements are constructed as hydraulically operable clamping cylinders, and wherein the clamping cylinders are arranged in a vertical direction on a top and a bottom of the cross members.

7. Crawler running gear, having a central section and two crawler supports with in each case a crawler track, the crawler supports being positioned in a longitudinal direction on both longitudinal sides of the central section and are fixed to cross members, which are in each case displaceably mounted in a displacement direction on said central section by means of at least one guide, wherein at least one clamping element is provided with which a cross member can be braced at right angles to the displacement direction with respect to its guide, wherein the clamping elements are constructed as hydraulically operable clamping cylinders, and wherein there are four clamping cylinders for each cross member.

8. Crawler running gear having a central section and two crawler supports with in each case a crawler track, the crawler supports being positioned in a longitudinal direction on both longitudinal sides of the central section and are fixed to cross members, which are in each case displaceably mounted in a displacement direction on said central section by means of at least one guide, wherein at least one clamping element is provided with which a cross member can be braced at right angles to the displacement direction with respect to its guide, wherein for at least one of the cross members clamping cylinders are provided on facing sides.

9. Crawler running gear according to claim 8, wherein the clamping cylinders are arranged in a vertical direction on a top and a bottom of the cross members.

10. Crawler running gear according to claim 8, wherein there are four clamping cylinders for each cross member.

11. Crawler running gear according to claim 8, wherein the clamping cylinders have clamping jaws.

12. Crawler running gear according to claim 11, wherein the clamping jaws and/or the cross members are provided with a coating and/or a profiling.

13. Crawler running gear according to claim 8, wherein a guide strut of the cross member is given a cross-sectional angular, construction.

14. Crawler running gear according to claim 8, wherein each crawler support is mounted on two cross members.

* * * * *